W. W. MULLENDORE.
MANUSCRIPT HOLDER.
APPLICATION FILED FEB. 6, 1915.
1,185,924.
Patented June 6, 1916.
2 SHEETS—SHEET 1.
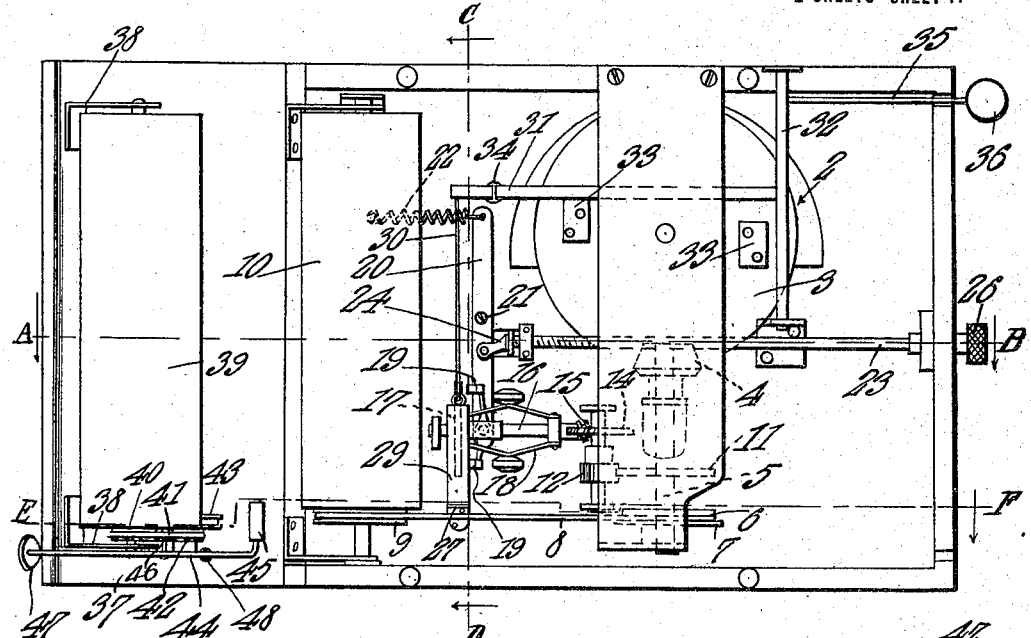
Fig. 1.
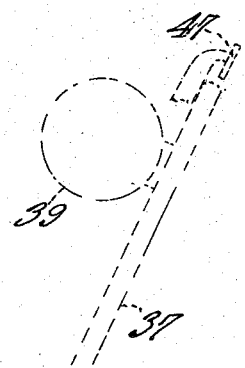
Fig. 2.
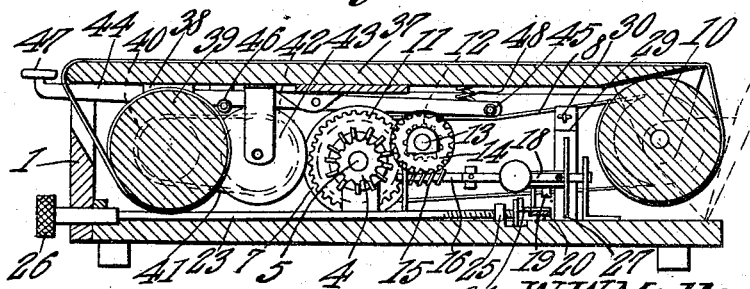
Witnesses
J. R. Tomlin
R. L. Parker
W. W. Mullendore, Inventor
by C. A. Snow & Co.
Attorneys
THE COLUMBIA PLANOGRAPH CO., WASHINGTON, D. C.

W. W. MULLENDORE.
MANUSCRIPT HOLDER.
APPLICATION FILED FEB. 6, 1915.
1,185,924.
Patented June 6, 1916.
2 SHEETS—SHEET 2.
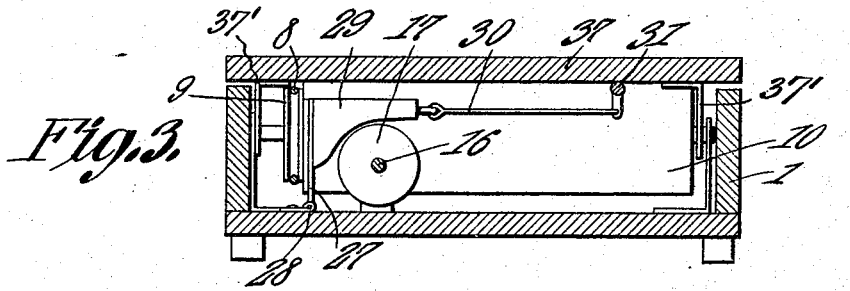
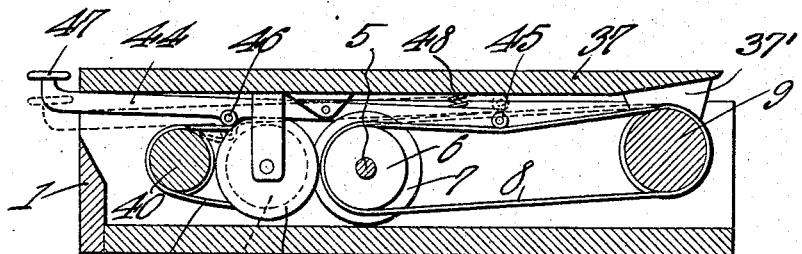
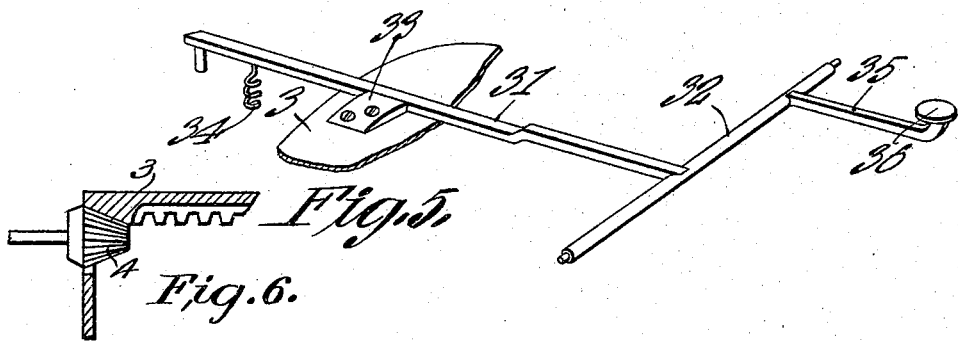
Witnesses
W. W. Mullendore, Inventor
by C. A. Snow & Co.,
Attorneys

UNITED STATES PATENT OFFICE.

WILLIAM W. MULLENDORE, OF FOUNTAIN CITY, TENNESSEE.

MANUSCRIPT-HOLDER.

1,185,924.  Specification of Letters Patent.  Patented June 6, 1916.

Application filed February 6, 1915. Serial No. 6,534.

*To all whom it may concern:*

Be it known that I, WILLIAM W. MULLENDORE, a citizen of the United States, residing at Fountain City, in the county of Knox and State of Tennessee, have invented a new and useful Manuscript-Holder, of which the following is a specification.

This invention relates to manuscript holders, one of its objects being to provide a simple and compact structure which can be carried readily and which is designed to hold an elongated strip of rolled manuscript, having means whereby the manuscript will be drawn automatically over the top of the holder, thus to unwind a portion of the unread part of the manuscript and to wind up that portion of the manuscript which has been read, the mechanism employed for this purpose being stopped automatically after a predetermined length of manuscript has been exposed to view.

A further object is to provide mechanism which can be readily operated to reverse the movement of the manuscript, thus either to rewind the manuscript or to bring back to view any part thereof which may have been wound upon the take-up roller.

A further object is to provide operating mechanism which is simple and compact in construction and which has combined with it a novel form of brake mechanism for bringing the mechanism to an abrupt stop.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of the manuscript holder with the top thereof raised out of normal position, thus to expose the interior mechanism. Fig. 2 is a section on line A—B Fig. 1, the top being shown in its closed or normal position, although being illustrated by dotted lines in the raised position shown in Fig. 1. Fig. 3 is a section on line C—D Fig. 1. Fig. 4 is a section taken approximately on line E—F Fig. 1 with the top in closed position. Fig. 5 is a detail view of the motor released lever, a portion of the top of the motor being shown. Fig. 6 is an enlarged section through a portion of the motor.

Referring to the figures by characters of reference 1 designates a box-like casing which can be made to simulate a book or can be of any other external appearance desired. This casing has a spring motor 2 arranged therein, said motor being of any preferred type but being preferably provided with a top disk 3 mounted for rotation, said disk being in the form of a gear constantly meshing with a gear 4 secured to a shaft 5 extending transversely within the casing. Said shaft is provided with a pulley 6 having a flange 7 constituting a friction disk and the said pulley 6 is adapted to transmit motion through a belt 8 to a pulley 9 arranged at one end of a take-up cylinder 10 arranged transversely within one end portion of the casing 1.

A gear 11 is secured to and rotates with the shaft 5 and meshes with a smaller gear 12 secured to a shaft 13, this last named shaft being provided with a worm gear 14 meshing with a worm 15. Said worm is connected to a governor shaft 16, the said governor shaft carrying the usual brake disk 17 to which the spring arms 18 of the governor are connected as usual. Brake shoes 19 are mounted on a lever 20 pivoted, as at 21 upon the bottom of the casing 1, there being a spring 22 for holding the brake shoes 19 yieldingly pressed toward the disk 17. An adjusting screw 23 is arranged within the casing 1 and bears against a finger 24 upon lever 20, this screw being threaded within a guide block 25 and having a head 26 upon one end thereof and located outside of the casing 1. By rotating this screw the same can be caused to press against the finger 24 and thus thrust the shoes 19 toward the disk 17 or, by reversing the rotation of the screw, the spring 22 can be caused to pull the shoes 19 away from the disk 17. Thus it will be seen that the speed of the motor can be controlled readily.

A plate 27 is hingedly connected, as at 28, to the bottom of the casing 1 and carries a brake shoe 29 which overhangs disk 17, this shoe being of such width as to always overhang the disk no matter to what position the disk may be shifted along the shaft 16 by the governor. Shoe 29 is connected, as by means of a rod 30, to a lever 31 which extends from a rod 32 mounted for rotation within the casing 1. This lever 31 rests upon the disk 3 and is adapted to be engaged by diametrically opposed stop shoulders 33 upon the disk 3. A spring 34 is connected to the lever 31 and serves to bind the lever lightly on the disk 3. A key lever 35 is connected to rod 32 and extends through one wall of the casing 1, the outer end of this lever being provided with a key 36. Thus it will be seen that when the key is depressed, lever 31 will be lifted out of the path of the shoulder 33 engaging it, thereby releasing the motor which will rotate until disk 3 has completed a one-half revolution, whereupon the next shoulder 33 on the disk will come against lever 31 and bring the motor to a stop. This movement of the shoulder against the lever will tend to spring the lever 31 laterally with the result that said lever will pull through rod 30 upon the brake shoe 29 and cause said brake shoe to bind on the disk 17 and thus stop the actuation of the governor at the same time that the motor is brought to a stop. Thus severe strains on the governor are prevented.

The casing 1 is provided with a cover 37 adapted normally to rest upon the top of the casing. Hinge members 37′ extend from this cover and are adapted to swing about the axis of cylinder 10. This cover is provided at that end thereof remote from its hinges with depending brackets 38 in which is journaled a cylinder 39 provided at one end with a pulley 40. This pulley is constantly engaged by a loose belt 41 engaging a pulley 42 at one side of a friction wheel 43 supported by and under the cover 37. The parts are so located and proportioned that when the cover 37 is in its closed position, the friction disk or wheel 43 will frictionally engage the disk 7 so that motion will thus be transmitted from said disk 7 to the disk 43 and pulley 42. Not only is the belt 41 normally loose so that motion will not be transmitted therethrough under ordinary conditions to the pulley 40, but the belt 8 is also normally loose so that motion will not be transmitted under ordinary conditions from pulley 6 to pulley 9.

For the purpose of controlling the transmission of motion to the respective cylinders 10 and 39, a lever 44 is fulcrumed upon the bottom of the cover 37 and is provided at one end with a roller 45 adapted to bear downwardly on the belt 8 while the other arm of the lever has a roller 46 adapted to bear downwardly on the belt 41. Said last named arm of the lever is extended beyond one end of the casing 1 and is provided with a key 47. A spring 48 may be interposed between the back portion of lever 44 and the cover 37 so as to hold the roller 45 normally pressed against the belt 8, thus to tighten said belt. At the same time roller 46 is held normally elevated from belt 41 so that said last named belt is thus kept loose.

In using the device, the strip of manuscript is secured at one end to the cylinder 39 and rolled upon the cylinder, after which the other end portion of the manuscript is extended over the top of the cover 37 and is secured to the cylinder 10. The motor 2, which can be wound in any manner desired, is held against movement by the lever 31 engaging one of the shoulders 33. As soon as the contents of the exposed portion of the manuscript have been read, the person using the holder depresses key 36 with the result that lever 31 is lifted out of engagement with the shoulder 33 and the motor immediately begins to operate. Motion is therefore transmitted from the motor through the mechanism described, to the cylinder 10, it being understood that the belt 8 is held taut by the spring pressed lever 44 and roller 45. Cylinder 10 will gradually wind up the manuscript until the next shoulder 33 comes against lever 31 whereupon the motor will be stopped as hereinbefore described, this operation taking place as soon as an entirely new portion of the manuscript has been exposed upon the cover 37. This operation can be continued until all of the manuscript has been unwound from the cylinder 39 and onto the cylinder 10, whereupon by depressing key 36 so as to release the motor and by depressing key 47 so as to loosen belt 8 and tighten belt 41, motion will be transmitted from the motor to the cylinder 39 with the result that the manuscript will be wound upon the cylinder 39 and unwound from the released cylinder 10. Obviously this rewinding of the manuscript can be made to occur at any time before the manuscript has been completely unwound from the cylinder 39 as, for example, when it is desired to reëxamine some portion of the manuscript which has been fed over the top of the holder.

What is claimed is:—

1. A manuscript holder including a casing having a motor, a take-up cylinder mounted for rotation in the casing, a normally loose belt for transmitting motion from said motor to the take-up cylinder, a cover movably connected to the casing, a cylinder supported thereunder, a friction disk driven by the motor, a friction disk connected to the cover and adapted to engage the first named friction disk when the cover is in closed position, a belt drive for transmitting motion from the friction disk on the cover to the cylinder carried by the cover, the belt of said drive being normally loose, manually operated means for alternately tightening said belts, and means for normally causing said tightening means to be operative on the belt of the take-up cylinder.

2. A manuscript holder including a casing, a motor therein including a disk mounted for rotation, opposed shoulders upon the disk, a lever normally engaged by one of the shoulders for holding the disk against rotation, a take-up cylinder, means for transmitting motion from the motor to the take-up cylinder, said means including a normally loose belt and a friction disk, a second cylinder, mechanism for transmitting motion thereto from the motor, said mechanism including a friction disk engaging the aforementioned friction disk and a belt drive, the belt of said drive being normally loose, manually operated means for alternately tightening said belts, and means for normally causing said tightening means to be operative upon the belt of the take-up cylinder.

3. A manuscript holder including a casing, a motor therein, a disk driven by the motor and having opposed shoulders, a lever normally engaged by one of the shoulders to hold the motor against movement, governor mechanism actuated by the motor and including a brake disk, a brake shoe constantly overhanging the disk, a connection between said shoe and the lever whereby the pressure of the shoulder on the motor disk against the lever will cause the said shoe to bind against the brake disk, thereby simultaneously to stop the motor and the governor mechanism, spaced cylinders, a normally loose belt drive for transmitting motion from the motor to one of the cylinders, a combined gear and normally loose belt drive for transmitting motion in a reverse direction from the motor to the other cylinder, and means under the control of a single key for tightening the belt of either drive thereby to place either cylinder into operative relation with the motor.

4. A manuscript holder including a casing, a motor therein, a lever, means carried by the motor for automatically engaging said lever to stop the motor after a predetermined movement, key controlled means for shifting the lever to release the motor, a take-up cylinder, a second cylinder, a normally loose belt drive for transmitting motion in one direction to the take-up cylinder from the motor, a combined gear and normally loose belt drive for transmitting motion in the opposite direction from the motor to the other cylinder, and key operated means for tightening the belt of either of said drives thereby to place either of the cylinders out of operative connection with the motor.

5. A manuscript holder including a casing having a top, a take-up cylinder within the casing adjacent one end of the top, another cylinder within the casing adjacent the other end of the top, a motor, means for holding the motor against movement, means extending from one end of the casing for releasing the motor, means for transmitting motion from the motor to the respective cylinders, each of said means including a normally loose belt, separate belt tightening means, means extending from one end of the casing for operating the said belt tightening means alternately to tighten the belts, said cylinders being rotated in opposite directions respectively.

6. A manuscript holder including a casing having a top, a take-up cylinder within the casing adjacent one end of the top, another cylinder within the casing adjacent the other end of the top, a motor, means for holding the motor against movement, means extending from one end of the casing for releasing the motor, means for transmitting motion from the motor to the respective cylinders, each of said means including a normally loose belt, separate belt tightening means, means extending from one end of the casing for operating said belt tightening means alternately to tighten the belts, said cylinders being rotated in opposite directions respectively, and means extending from one end of the casing for controlling the speed of rotation of the cylinders.

In testimony that I claim the foregoing as my own, I have hereto affixed my signature in the presence of two witnesses.

WILLIAM W. MULLENDORE.

Witnesses
 IVY E. SIMPSON,
 PHILOMENA A. ROCKELLI.

Copies of this patent may be obtained for five cents each, by addressing the "Commissioner of Patents, Washington, D. C."